May 23, 1961 F. R. GROSS 2,985,435
HEAT-TRANSFER APPARATUS
Filed Aug. 27, 1956 2 Sheets-Sheet 1
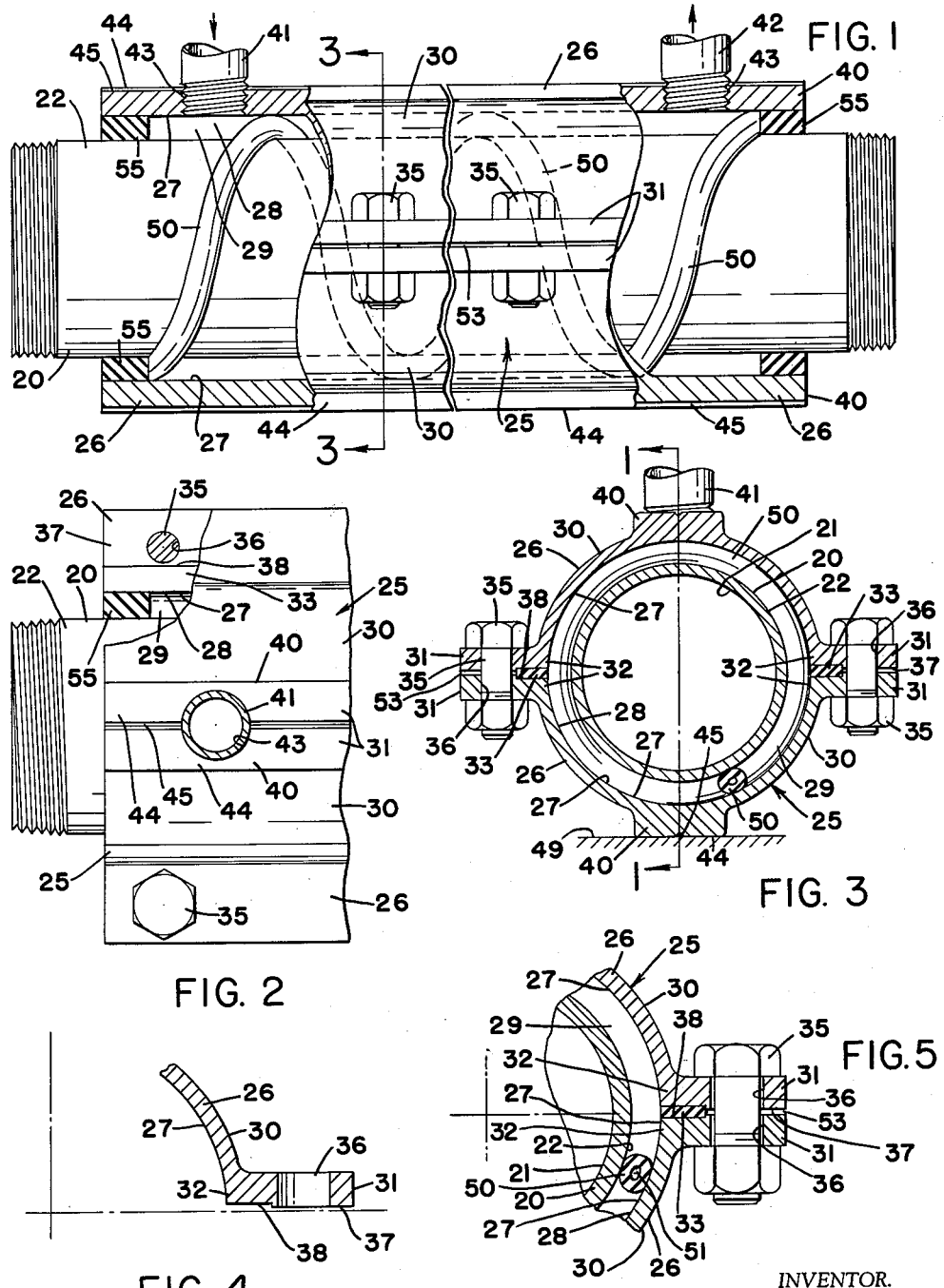
INVENTOR.
FRANK R. GROSS
BY
*Willis F. Avery*
ATTORNEY May 23, 1961  F. R. GROSS  2,985,435
HEAT-TRANSFER APPARATUS
Filed Aug. 27, 1956  2 Sheets-Sheet 2
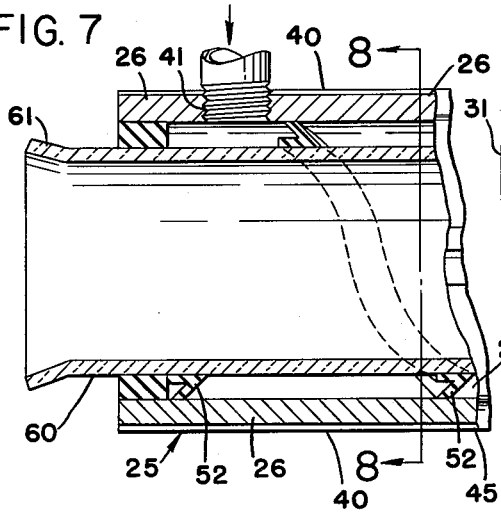
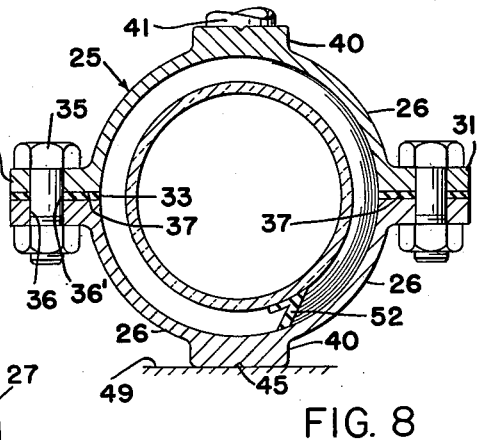
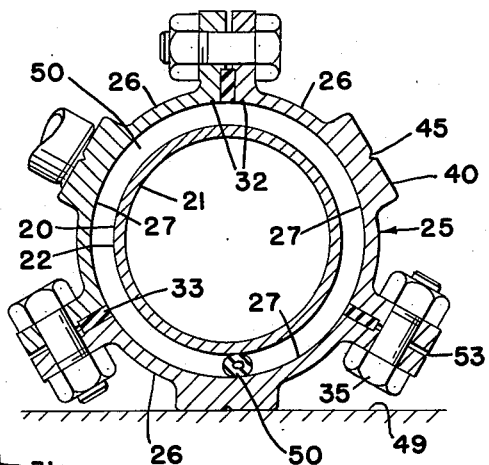
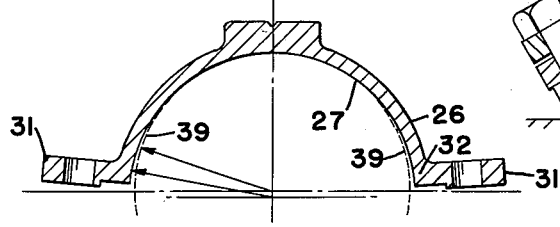
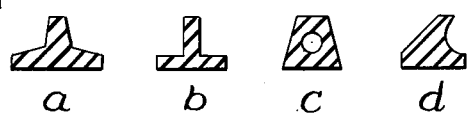
INVENTOR.
FRANK R. GROSS
BY
*Willis F. Avery*
ATTORNEY United States Patent Office 2,985,435
Patented May 23, 1961

2,985,435
HEAT-TRANSFER APPARATUS
Frank Robert Gross, 3926 Wood Thrush Road,
Akron 13, Ohio
Filed Aug. 27, 1956, Ser. No. 606,385
13 Claims. (Cl. 257—246)

This invention relates to heat-transfer apparatus, especially to constructions for facilitating the transfer of heat through heat-conducting walls of heat-transfer apparatus by the circulation of fluid heat-transfer medium in contact with the heat-conducting walls, and particularly to constructions providing passages contiguous to the said heat-conducting walls, through which the fluid heat-transfer medium is circulated, and to means for readily and economically constructing the heat-transfer apparatus in a wide range of heat-transfer capacity.

In a common form of heat-transfer apparatus, the primary heat-conducting wall is of a generally cylindrical shape, and frequently a multiplicity of such heat-conducting cylindrical walls are assembled into a multiple-unit heat-transfer apparatus. A heat-transfer unit normally comprises, in addition to the heat-conducting cylindrical wall member, means for maintaining a fluid heat-transfer medium in moving contact with said heat-conducting wall member, commonly a cylindrical wall member of greater diameter than, and arranged substantially concentrically with respect to, the heat-conducting cylindrical wall member, thus forming an annular space about the heat-conducting wall member through which the heat-transfer medium may be circulated. In many cases, in such a heat-transfer unit, a system of baffles is provided within the annular space in order to cause the heat-transfer medium to circulate through the annular space in an elongated passageway at relatively high speeds in contact with the heat-conducting wall member.

Heretofore, it has been difficult or impractical, and in some cases impossible, to utilize effectively the presently available heat-transfer apparatus, of the type described in the preceding paragraph, in laboratory pilot plant and other specialized operations, since the heat-transfer apparatus now available is unable to meet the widely varied requirements of such heat-transfer apparatus in the greatly diversified operations which every sizable laboratory and pilot plant and numerous specialized operations are called upon effectively to carry out.

It is the purpose of the present invention to provide the much needed highly efficient, economical, adjustable capacity heat-transfer apparatus for laboratory, pilot plant and other specialized operations. This objective is attained by constructing a heat-transfer unit of standardized preformed parts of such character that the heat-transfer apparatus can be "tailor-made," on location, if desired, to meet any of a wide variety of requirements, all parts being (1) readily separable one from the other, (2) capable of ready assembly into a heat-transfer unit of various capacities, (3) capable of being readily disassembled for cleaning or for adjustment of the heat-transfer capacity, and (4) reassembled so as to have the same or a different heat-transfer capacity.

This invention is applicable to any heat-transfer unit having a substantially cylindrical heat-conducting wall member, that is, one in which the wall member is annular in every normal cross-section. The term "annular" is used herein with a broad meaning and not limited to a circular ring section, and the term "cylindrical" is also used in this specification and in the appended claims with a broad meaning to include any cylindrical, cylindroidal or other cylinder-like heat-conducting wall member and/or casing member therefor, which wall member or casing member is substantially "annular" in normal cross-section, as the term is herein employed.

Other objects and advantages of the invention of this application will be apparent from the description in the following specification of the constructions illustrated in the accompanying drawings, in which Fig. 1 is a representation, partially in section and partially in elevation, with parts broken away, of a preferred embodiment of heat-transfer apparatus of this application, taken on line 1—1 of Fig. 3;

Fig. 2 is a fragmentary plan view looking down on the structure of Fig. 1;

Fig. 3 is a cross-sectional view of the heat-transfer apparatus of Figs. 1 and 2, taken on line 3—3 of Fig. 1;

Fig. 4 is an enlarged fragmentary cross-section of the means for joining the casing sections to form the casing;

Fig. 5 is an enlarged fragmentary sectional view of a flange of a section of the heat-transfer apparatus casing;

Fig. 6 is a cross-sectional view similar to that of Fig. 3, the casing being made up of three sections;

Fig. 7 is a view partially in section and partially in elevation of a second embodiment of this invention;

Fig. 8 is a cross-sectional view taken on line 8—8 of Fig. 7.

Fig. 9 is a cross-sectional view of a further modification of a casing section; and Figs. 10a, 10b, 10c and 10d are cross-sectional views of the baffle, illustrating some of the cross-sections suitable for the extruded baffle of this application.

Referring to Figs. 1 to 5 of the drawing, which illustrate one embodiment of the invention of this application, the numeral 20 designates the hollow cylindrical heat-conducting wall member having an inner surface 21 and an outer surface 22. The heat-conducting wall member 20 is annular in cross-section. The hollow cylindrical heat-conducting wall 20 may be made of any suitable heat-conducting material and preferably of a material that has both strength and lightness. A casing 25, made up of sections 26, having an inner surface 27 so formed that when the sections 26 are assembled in place the casing 25 is provided with an inner cylindrical surface 28 spaced from the outer surface 22 of the hollow cylinder wall member 20 so as to form an annular space 29 therebetween.

Each section 26 of the casing 25 is preferably made by the extrusion through a suitable die of an extrudable material, such as aluminum or an aluminum alloy, or other extrudable metal or of one of the extrudable plastics, preferably a material that is corrosion-resistant to the cooling media, such as raw water from natural sources. Each section 26 has the same cross-section throughout its length. An aluminum or aluminum alloy is preferred to other extrudable materials for the casing sections for the reason that it is not only light and strong and resistant to warping in use, but, what is more important, the aluminums take and retain intricate cross-sectional dimensions uniformly and with great accuracy.

As shown in Figs. 1 to 5, the inner surface 27 of each of the two sections 26 is smooth and cylindrical in shape. The outer surface 30 of each of the two sections 26 has two flange portions 31, each coextensive in length with the length of the section 26, and each flange portion 31 extending radially outwardly from each of the longitudinal edge portions 32 of the sections 26, a distance sufficient to embrace packing later to be described and to provide for assembly bolts 35, which pass through openings 36, spaced along the flange portions 31. Each flange portion 31 is coextensive in length with the length of the section 26. As shown more clearly in Fig. 4, each flange portion 31 has a contiguous surface portion 37 having a shallow recess 38 for the receipt of the packing 33, which recess extends the length of the flange 31 of the section 26.

Each section 26 of the casing 25 also has a protruding or thickened portion 40, integral therewith, extending longitudinally along the outer side of section 26, coextensive in length therewith, and preferably disposed approximately equi-distant from the two flange portions 31 of the section 26. The protruding portion 40 may be of any desired thickness and width and should preferably be of such thickness and width as to provide an adequate base for an inlet 41 and outlet 42, which are threaded into, or otherwise secured to, openings 43 drilled at the proper places in the protruding portion 40.

Preferably the wall portion of section 26 extending between the flange portion 31 and the thickened portion 40 should be relatively thin as compared to the thickness of the flange 31 and thickened portion 40, so as to have a considerable degree of flexibility when the sections are assembled.

It is desirable for some purposes to have the outer face 44 of the thickened portion 40 a plane surface disposed at right angles to a plane passing through the axis of the cylinder and a center marking 45 on the outer face 44. As shown, the center marking 45 takes the form of a slight groove which extends the length of the outer face 44 and serves as a guide for the drilling of the openings 43 in the thickened portion 40. Further, in the assembly of a heat-transfer unit, section 26 can be set on a table 49 with the face 44 resting on the table and thus provide a firm and steady support for all parts of the heat-transfer unit during the assembly operation.

The baffle member 50 is formed from a continuous strip of a water-impervious elastically compressible material which may have any suitable cross-section and preferably should have a radial thickness somewhat greater than the radial distance between the outer surface 22 of the heat-conducting wall member 20 and the inner surface 27 of the assembled casing 25. A baffle member 50, which may be of circular cross-section, has been found to be practical and may or may not have a centrally disposed hollow core 51, as shown in Fig. 5.

A flat ribbon-like sealing strip 33 is also made, as by extrusion, from a water-impervious elastically compressible material, and of a width to fit into the recess 38 of each of two contiguous sections 26 and of a thickness such that when the two contiguous sections are joined together in operative position by the bolts 35, the opposing surfaces 37 of contiguous flanges 31 will not be in contact, but will be separated by a narrow space 53.

A gasket ring 55 is also made of water-impervious elastically compressible material and as shown in Fig. 1 is rectangular in cross-section. The thickness of the ring should be somewhat greater than the distance between the outer surface 22 of the heat-conducting wall member 20 and the inner surface 27 of the casing 25, when assembled, so as to form a watertight joint at each end of the annular space 29. The gasket ring 55 may also be circular or of other shape in cross-section and of the material and diameter of the baffle member 50.

With respect to heat-transfer unit having any particular outside diameter 22 of the cylindrical heat-conducting wall member 20, one set of parts adequately serves to construct heat-transfer units of differing lengths and heat-transfer capacities. By way of illustration, with a cylindrical heat-conducting wall member 20 having a 2 inch inside diameter and about 2¼ inch outside diameter, depending on the thickness of the heat-conducting wall 20, and of suitable length, and a sectional outer casing member 25, made in two, three or more sections as by extrusion of aluminum into strips of considerable length, and cut to proper length, so that, when assembled, the casing will have about 2¾ inch inside diameter and provide an annular space with the radial distance between the outer wall of the heat-conducting member and the inner wall of the casing member of about ¼ inch, as shown in Figs. 1 to 3.

It has been found desirable in practice to keep in stock a supply of heat-conducting wall member parts 20 and of casing sections 26, in lengths as great, or greater than, any of the operations of the laboratory, pilot plant or special operations, as the case may be, will require. The baffle 50, and the sealing strips 33, are each preferably made up in rolls, such as rolls of 100 yards or more, and the gasket ring 55 also stocked in quantities for ready availability.

It is to be understood that the extruded baffle 50 may have other cross-sections than that disclosed in Fig. 5, and that extruded baffles having a wide variety of cross-sections of which those shown in Figs. 7 and 10 are illustrative only.

The embodiment disclosed in Figs. 7 and 8 is one particularly adapted for laboratory and pilot plant operations in that the heat-conducting wall member 60 is made of glass or plastic, and has the usual flared end portions 61 for connection to conventional fittings which attach to supply and delivery means. The specific baffle 52 is optional, and any one of the baffles shown in Figs. 1, 7 and 9 may be employed in any of the embodiments of this invention. The contiguous surfaces 37 of the flanges 31 each lie in a plane, instead of being recessed as in Figs. 1 to 6, and the packing 33 is substantially coextensive with the contiguous surfaces 37, both in length and width, and has circular openings 36' therein registering with the openings 36 in the flanges 31, for passage of the bolts 35 therethrough which join the sections 26 together to form the casing 25.

In one method of assembly, found in practice to be highly effective, one section 26 of the casing 25, of required length, is laid on table 49, with the plane surface 44 contacting a table 49, as shown in Fig. 3 of the drawing, and the sealing strips 33 are laid in the recesses 38. The heat-conducting wall member 20 is then equipped with the gasket rings 55, as by stretching the ring over the outer surface 22 of wall member 20, the exact location on the said surface 22 having been marked in advance. The baffle 50 is then wound helically around the surface 22 of the wall member 20, as from a roll of extruded baffle material, the ends of the baffle 50 being temporarily attached to the gasket rings 55 or the outer surface 22, as by adhesion or by clips. The wall member 20, with the gaskets 55 and baffle 50, is then placed in the section 26, having the sealing strips 33 in place therein, and pressed firmly into the open half-cylindrical cavity in the section 26. Then, the upper section 26 is placed over the wall member 20 resting in the lower section 26 and the two sections 26 are joined together by tightening the bolts 35 through the openings 36 in the flanges 31. In this manner, a heat-transfer unit is readily assembled.

In the embodiment disclosed in Fig. 9, the section 26, instead of having a truly cylindrical inner surface 28, which surface where truly cylindrical is shown by dotted line 39 of Fig. 9, has the edge portions 32 of each section 26 disposed slightly spread away from each other, and, when the two sections 26 are drawn together by the flange bolts 35, are drawn toward each other so as to bring the inner surface 27 of the two sections into substantially cylindrical form. The initial spreading of the longitudinal edge portions 32 of the sections 26, enables the heat-conducting wall member 20 with the baffle 50 wrapped therethrough to be pressed without distortion of the baffle into the open half cylindrical cavity of one section 26 and for the second section 26 to be readily placed over the heat-conducting wall member 20. Upon bringing the flanges 31 of both sections 26 into operative position, by tightening the bolts 35 to bring together the flanges 31, the inner surface 28 of the casing 25 assumes a substantially cylindrical shape.

It has been found that where it is desirable to increase or decrease the heat-transfer capacity of the heat-transfer unit, this may be readily accomplished by rebuilding the unit and rewinding the helical baffle 50, either increasing the number of turns in the helix to secure greater heat-transfer capacity or decreasing the number of turns in the helix to lower the heat-transfer capacity of the unit.

It has been indicated that the outer casing 25 may be made up of more than one section 26, and in fact where the heat-conducting wall 20 is more than 2 inches in diameter, it may be advantageous to have the outer casing 25 made up of three or more sections. In Fig. 6 is shown a heat-transfer unit in which three sections 26 are employed. There is no fundamental difference in the construction or operation of a heat-transfer unit in which the casing is made up of three or more sections. However, for large diameter heat-conducting wall assemblies, and even those having inner diameters of 2 inches, there is some advantage in that where a greater number of sections are employed, the pressures exerted by the inner walls 27 of the casing 25 on the elastically deformable baffles 50 may be more evenly applied, that is, the compressive forces exerted by the casing are more uniformly distributed throughout the length of the baffle member. Otherwise, the description above and the reference numerals apply equally well to Fig. 6, and a repetition of the detailed description in connection with Fig. 6 is deemed to be unnecessary.

The above described embodiments of this application are to be understood to be illustrative only and not in limitation of the invention of this application, the embodiments of which herein disclosed are capable of being varied by one skilled in the art without departing from the scope and spirit of this invention as defined in the appended claims.

This application is a continuation-in-part of my prior application S.N. 327,741, filed December 24, 1952, now Patent No. 2,915,292, granted December 1, 1959.

What is claimed is:

1. In a readily assembled and disassembled heat-transfer apparatus consisting essentially of a central hollow cylindrical tubular member having a heat-conducting wall portion and being open at each end for the passage of fluids therethrough, a lengthwise sectional casing for said heat-conducting wall portion extending substantially the length of said heat-conducting wall portion and having an inner substantially cylindrical surface of a diameter sufficiently greater than the outside diameter of the said heat-conducting wall portion to provide an annular space of limited cross-sectional area and of substantially uniform radial distance between the cylindrical wall surfaces defining said annular space, resiliently deformed plastic annular sealing means at each end of the said annular space to form an annular fluid-tight chamber, resiliently deformed plastic baffle means positioned in said fluid-tight chamber to define an elongated passageway from one end to the other end of said fluid-tight chamber, with means for passing heat-transfer medium into and out of the said elongated passageway, in combination, a longitudinally sectional casing for the said heat-conducting wall portion which comprises a plurality of longitudinally extending sections, each section being of a length substantially that of the length of the said heat-conducting wall portion and having a substantially cylindrical inner surface, a longitudinal flange portion protruding outwardly from each of the longitudinal edge portions of the section to provide means for fastening together contiguous sections, and an outwardly protruding thickened wall portion extending the length of the section and positioned between the two flanged portions of the section, and readily removable fastening means for securing the flanges of contiguous sections to each other in the assembly of the sectional casing.

2. The sectional casing as defined in claim 1 in which the surface of each flange portion that faces a similar surface of a flange portion of a contiguous section, when the casing is assembled, has a longitudinally extending recess for the inclusion of a resilient deformable packing member.

3. The sectional casing as defined in claim 1 in which the wall portions of each section between each flange portion and the protruding thickened wall portion are relatively thin to give workable flexibility to the section during assembly.

4. The sectional casing as defined in claim 1 in which the protruding thickened wall portion is mid-way between and spaced from the flange portions and the wall portions between the thickened wall portion and the flange portions are relatively thin to give workable flexibility.

5. The sectional casing as defined in claim 1 in which the protruding thickened wall portion of each section has a flat plane outer surface substantially normal to a plane passing through the axis of the cylindrical casing, whereby each section may be stably supported by resting the said flat plane outer surface on a horizontal surface of a support.

6. The sectional casing as defined in claim 5 in which the flat plane outer surface of the protruding thickened wall portion has a straight line marking extending the length of and substantially in the middle of the said flat plane outer surface, whereby the said section can be readily centrally and radially drilled to provide inlet and outlet openings for passing heat-transfer medium into and out of the passageway of the fluid-tight chamber.

7. A readily assembled and disassembled heat-transfer apparatus comprising in combination a central hollow tubular member having a cylindrical heat-conducting wall portion extending a substantial distance along the said tubular member, a lengthwise sectional casing for said heat-conducting wall portion extending the length thereof and having an inner substantially cylindrical surface of a diameter greater than the outside diameter of said heat-conducting wall portion to provide an annular space of substantially uniform radial distance between the two cylindrical surfaces defining said annular space, resiliently deformed plastic annular sealing means at each end of said annular space to form an annular fluid-tight chamber, resiliently deformed plastic baffle means positioned in said fluid-tight chamber to define an elongated spiral fluid-tight passageway from one end to the other end of said fluid-tight chamber with means for passing heat-transfer medium into and out of said passageway, the said sectional casing being made up of a plurality of longitudinally extending sections, each section being of a length substantially that of the said heat-conducting wall portion and having substantially the same cross-section throughout its entire length and having a cylindrical inner surface extending the length of the section, a longitudinal flange protruding outwardly from each of the longitudinal edge portions of the section to provide means for fastening together contiguous sections, and a longitudinally extending and outwardly protruding thickened wall portion extending the length of the section and positioned between and spaced from the said two flanges, and readily removable fastening means for securing the flanges of contiguous sections to each other.

8. The heat-transfer apparatus defined in claim 7 in which said resiliently deformed baffle is circular in cross-section before deformation.

9. The heat-transfer apparatus defined in claim 7 in which the said resiliently deformed baffle is a tube circular in cross-section before deformation.

10. A sectional casing made up of a plurality of longitudinally extending sections, each section having substantially the same cross-section throughout its entire length and having a cylindrical inner surface extending its entire length, a longitudinal flange protruding outwardly from each of the longitudinal edge portions of the section, and a longitudinally extending and outwardly protruding thickened wall portion extending the length of the section and positioned between and spaced from the said two longitudinal flanges of the section, the wall portion between each flange and the protruding thickened wall portion being relatively thin to give workable flexibility to the section during assembly of the sectional casing.

11. In a readily assembled and disassembled heat-transfer apparatus for a cylindrical pipe having a substantially cylindrical heat-conducting wall portion for the transfer of heat therethrough, in combination, a sectional casing comprising a plurality of sections extending lengthwise of the said pipe and embracing a heat-conducting wall portion thereof, each section having substantially the same cross-section throughout its entire length and having a longitudinal flange portion protruding outwardly from each of the longitudinal edges of the section to provide means for fastening together contiguous sections and an outwardly protruding thickened wall portion extending the entire length of the section and positioned between and spaced from the said flanges, the said sectional casing having an inner substantially cylindrical wall surface of a diameter sufficiently greater than the outside diameter of the said cylindrical heat-conducting wall portion to provide an annular space of limited cross-sectional area between the two said cylindrical wall surfaces defining the annular space, sealing means disposed between the two said cylindrical wall surfaces near each end of the sectional casing to provide a closed fluid-tight annular chamber therebetween, resiliently deformed plastic partition means positioned spirally in said fluid-tight chamber to define an elongated fluid-tight passageway from one end to the other end of said fluid-tight chamber, and means for passing heat-transfer medium into one end of said passageway and out of the other end of the said passageway.

12. The heat-transfer apparatus as defined in claim 11 in which the wall portions of each section between each flange portion and the protruding thickened wall portion are relatively thin to give workable flexibility to the section during assembly of the sections.

13. The heat-transfer apparatus as defined in claim 11 in which the protruding thickened wall portion of each section has a flat plane outer surface substantially normal to a plane passing through the axis of the said cylindrical wall surface.

References Cited in the file of this patent

UNITED STATES PATENTS

| Number | Name | Date |
|---|---|---|
| 592,017 | McCauley | Oct. 19, 1897 |
| 635,955 | Campbell | Oct. 31, 1899 |
| 896,333 | Smith | Aug. 18, 1908 |
| 1,026,211 | Kissinger | May 14, 1912 |
| 1,725,549 | Swenson | Aug. 20, 1929 |
| 1,776,855 | Holmes | Sept. 30, 1930 |
| 1,911,126 | Pfefferle | May 23, 1933 |
| 2,240,537 | Young | May 6, 1941 |
| 2,284,670 | McCullough et al. | June 2, 1942 |
| 2,377,510 | Newell | June 5, 1945 |
| 2,397,069 | Young et al. | Mar. 19, 1946 |
| 2,439,979 | Krooss | Apr. 20, 1948 |
| 2,445,115 | Hanrahan | July 13, 1948 |
| 2,488,807 | Currie | Nov. 22, 1949 |
| 2,521,369 | Holm et al. | Sept. 5, 1950 |
| 2,549,687 | Jack et al. | Apr. 17, 1951 |
| 2,611,585 | Boling | Sept. 23, 1952 |
| 2,707,098 | Turpin | Apr. 26, 1955 |
| 2,723,108 | Butler et al. | Nov. 8, 1955 |
| 2,787,051 | Risley | Apr. 2, 1957 |